(12) United States Patent
Konno et al.

(10) Patent No.: US 7,925,812 B2
(45) Date of Patent: Apr. 12, 2011

(54) CARD-TYPE PERIPHERAL DEVICE

(75) Inventors: Tamaki Konno, Tokyo (JP); Yoshitaka Aoki, Kanagawa (JP); Keiichi Tsutsui, Kanagawa (JP); Naohiro Adachi, Kanagawa (JP)

(73) Assignee: Sony Corporation, Tokyo (JP)

( * ) Notice: Subject to any disclaimer, the term of this patent is extended or adjusted under 35 U.S.C. 154(b) by 68 days.

(21) Appl. No.: 12/283,008

(22) Filed: Sep. 9, 2008

(65) Prior Publication Data

US 2009/0077295 A1 Mar. 19, 2009

(30) Foreign Application Priority Data

Sep. 14, 2007 (JP) ................................. 2007-239636

(51) Int. Cl.
*H05K 7/10* (2006.01)
*G06F 13/36* (2006.01)
*H01R 31/06* (2006.01)

(52) U.S. Cl. ........ 710/301; 710/105; 710/302; 710/305; 710/313; 710/315; 439/628; 439/638

(58) Field of Classification Search .................. 710/105, 710/301, 302, 305
See application file for complete search history.

(56) References Cited

U.S. PATENT DOCUMENTS

| | | | |
|---|---|---|---|
| 5,155,663 A | 10/1992 | Harase | |
| 5,548,741 A | 8/1996 | Watanabe | |
| 6,219,256 B1 | 4/2001 | Wu | |
| 6,382,995 B1 | 5/2002 | Bricaud et al. | |
| 6,524,137 B1 | 2/2003 | Liu et al. | |
| 6,709,281 B2 | 3/2004 | Shishikura et al. | |
| 6,739,515 B1 | 5/2004 | Wallace | |
| 6,994,263 B2 | 2/2006 | Ueda et al. | |
| 7,008,240 B1 * | 3/2006 | Wang et al. | |
| 7,021,971 B2 * | 4/2006 | Chou et al. | |
| 7,057,268 B1 | 6/2006 | d'Estries | |
| 7,073,010 B2 * | 7/2006 | Chen et al. | 710/313 |
| 7,123,511 B2 | 10/2006 | Newell | |
| 7,136,951 B2 | 11/2006 | Deng et al. | |
| 7,172,464 B1 | 2/2007 | Lee | |

(Continued)

FOREIGN PATENT DOCUMENTS

JP 04-124790 A 4/1992

(Continued)

OTHER PUBLICATIONS

PCMCIA: "The ExpressCard™ Standard—The Next Generation PC Card Technology" Oct. 2003 Retrieved from the Internet: URL: http://www.expresscard.org/files/ExpressCardWP.pdf, [retrieved on Aug. 9, 2005].

(Continued)

*Primary Examiner* — Brian T Misiura
(74) *Attorney, Agent, or Firm* — Wolf, Greenfield & Sacks, P.C.

(57) ABSTRACT

A card-type peripheral device having a plurality of specifications of external interfaces includes a connector configured to connect the card-type peripheral device to a connectable device connectable to the card-type peripheral device, the connector including a dedicated terminal in which an interface to be used is set; an electronic component configured to be accessed via the set interface; a plurality of interface function units each configured to control an interface compliant with one of the plurality of specifications; and a communication function unit configured to perform communication with the electronic component using one of the interface function units having a specification corresponding to a setting of the dedicated terminal.

8 Claims, 6 Drawing Sheets

U.S. PATENT DOCUMENTS

| | | | |
|---|---|---|---|
| 7,189,118 B2 | 3/2007 | Lee | |
| 7,210,967 B1 | 5/2007 | Lee | |
| 7,254,664 B2* | 8/2007 | Hsieh | 710/315 |
| 7,285,023 B1* | 10/2007 | Chang et al. | 439/638 |
| 7,314,388 B2 | 1/2008 | Yamada et al. | |
| 7,325,745 B2 | 2/2008 | Chang et al. | |
| 7,357,643 B1* | 4/2008 | Chen et al. | 439/65 |
| 7,412,553 B2 | 8/2008 | Morrow | |
| 7,427,026 B2 | 9/2008 | Kojima et al. | |
| 7,673,092 B2* | 3/2010 | Zhao et al. | 710/313 |
| 2005/0114587 A1* | 5/2005 | Chou et al. | 711/103 |
| 2005/0138288 A1* | 6/2005 | Chou et al. | 711/115 |
| 2005/0251609 A1* | 11/2005 | Chou et al. | |
| 2005/0258243 A1* | 11/2005 | Hsieh | |
| 2008/0071963 A1* | 3/2008 | Chow et al. | |
| 2008/0123282 A1* | 5/2008 | Chiang et al. | |
| 2008/0168197 A1* | 7/2008 | Salomon et al. | |
| 2009/0002933 A1* | 1/2009 | Hubert et al. | |
| 2009/0006682 A1* | 1/2009 | Hubert et al. | |
| 2009/0006698 A1* | 1/2009 | Hubert et al. | |
| 2009/0006707 A1* | 1/2009 | Hubert et al. | |
| 2009/0013134 A1 | 1/2009 | Chen et al. | |
| 2009/0061688 A1* | 3/2009 | Aoki et al. | |
| 2009/0063743 A1* | 3/2009 | Aoki et al. | |

FOREIGN PATENT DOCUMENTS

| | | |
|---|---|---|
| JP | 10-334206 A | 12/1998 |
| JP | 2002-517834 T | 6/2002 |
| JP | 2005-050280 A | 2/2005 |
| JP | 2005-284323 A | 10/2005 |
| JP | 2006-106826 A | 4/2006 |
| JP | 2006-185677 A | 7/2006 |

OTHER PUBLICATIONS

Nikkei Electronics, "Lending Trends", Jun. 9, 2003, pp. 67-76.

* cited by examiner

CARD-TYPE PERIPHERAL DEVICE

CROSS REFERENCES TO RELATED APPLICATIONS

The present invention contains subject matter related to Japanese Patent Application JP 2007-239636 filed in the Japanese Patent Office on Sep. 14, 2007, the entire contents of which are incorporated herein by reference.

BACKGROUND OF THE INVENTION

1. Field of the Invention

The present invention relates to a card-type peripheral device such as a memory card.

2. Description of the Related Art

Card-type peripheral devices designed to be inserted into card slots of personal computers (PCs), called PC cards, have been available.

With the recent advent of high-speed compact PCs, ExpressCard (which was named "NEWCARD") devices have been proposed as card-type peripheral devices having a smaller outer size and higher data transfer speed than PC cards (see, for example, "Pi-shi kado wo kogata kosoku ni: Shinkikaku 'NEWCARD' ga paso-kon no shinka wo atooshi (For Increased-Compactness and Increased-Speed of PC Cards: New Standard 'NEWCARD' Accelerates the Evolution of PCs)", pp. 67-76, Jun. 9, 2003 issue, Nikkei Electronics).

ExpressCard is a standard intended to replace traditional PC cards (PCMCIA cards), developed by the Personal Computer Memory Card International Association (PCMCIA), and is a card using a Peripheral Component Interconnect (PCI) Express interface. PCI Express is an input/output (I/O) bus standard intended to replace traditional PCI buses.

ExpressCard cards achieve interfaces that have significantly higher speeds than traditional cards.

Accordingly, ExpressCard cards with a non-volatile memory would provide high-speed recording and reproduction if they were used as memory cards.

Due to its ease of use, ExpressCard technology is expected to be used for a wide variety of devices such as digital cameras, mobile phones, personal digital assistants (PDA), and music players.

An ExpressCard card has a function of a removable memory card including PCI Express and Universal Serial Bus (USB) interfaces as external interfaces.

In the ExpressCard specification, applications to be installed on ExpressCard cards have no requirements. An application to be installed may be implemented using either PCI Express or USB interface, or even using both interfaces.

SUMMARY OF THE INVENTION

Among ExpressCard applications, one example of applications implementable using either PCI Express or USB interfaces is a storage memory.

In systems for which high speed performance is demanded, cards implemented using a PCI Express interface are used.

In systems for which high speed performance is not demanded but connectivity with out-of-date systems (e.g., old PCs) is demanded, cards implemented using a USB interface are used through USB cable adapters or the like.

In a case where the advantages of both interfaces are demanded, cards having both interfaces may be used. In this case, a mechanism for switching between the interfaces is provided.

Without such a switching mechanism, a host device could identify a common storage region as two interfaces. In this case, the host device does not recognize that the storage region is shared by the two interfaces within a card, and handles the card as if two different cards were inserted.

The host device therefore individually accesses PCI Express and USB interfaces, and, as a result, may experience a problem that the use of one of the interfaces could cause destruction of data obtained by accessing the other interface.

As a switching mechanism, a connector terminal defined by the ExpressCard specification includes terminals (CPPE# and CPUSB#) for notifying a host device of an interface of a card but does not include a dedicated terminal for switching between the interfaces.

One method of switching between the interfaces is to place a dedicated mechanical switch on a housing of a card so that a user may switch between the interfaces using the switch depending on the use.

This method, however, has a drawback in that a user is caused to perform a time-consuming operation of switching between the interfaces using the switch.

It is therefore desirable to provide a card-type peripheral device capable of switching between interfaces without causing a user to perform any time-consuming operation.

In an embodiment of the present invention, a card-type peripheral device having a plurality of specifications of external interfaces includes a connector configured to connect the card-type peripheral device to a connectable device connectable to the card-type peripheral device, the connector including a dedicated terminal in which an interface to be used is set; an electronic component configured to be accessed via the set interface; a plurality of interface function units each configured to control an interface compliant with one of the plurality of specifications; and a communication function unit configured to perform communication with the electronic component using one of the interface function units having a specification corresponding to a setting of the dedicated terminal.

Preferably, a level of the dedicated terminal is set using the connectable device according to a specification.

Preferably, the interface function unit having the specification corresponding to the setting of the dedicated terminal is enabled, and at least one of the interface function units having a specification that does not correspond to the setting of the dedicated terminal is disabled.

Preferably, the communication function unit recognizes which specification of interface is enabled to be controlled on the basis of the setting of the dedicated terminal, and performs communication with the electronic component using one of the interface function units corresponding to the recognized specification.

Preferably, each of the interface function units includes an analog circuit connected to the connector via a transmission line, the analog circuit including an enable terminal for determining whether the analog circuit is enabled or disabled according to a setting level of the dedicated terminal, and a logic circuit configured to operate in synchronization with a clock signal to transmit and receive data to and from the communication function unit, and, in accordance with the setting of the dedicated terminal, at least one of the interface function units is configured such that the analog circuit is disabled and the supply of the clock signal to the logic circuit is stopped.

Preferably, the connectable device is an adapter, and includes a switch capable of switching a setting level of the dedicated terminal according to a specification supported by a device to which the adapter is connected.

Preferably, the connector includes an output terminal capable of requesting the connectable device to transmit a condition to be notified.

Preferably, the connectable device includes a notification unit configured to transmit the condition in response to the request from the output terminal.

Preferably, the electronic component includes a non-volatile memory, and has a function of a memory card capable of recording and reproducing data via the set interface.

Preferably, the plurality of specifications include a Peripheral Component Interconnect Express specification and a Universal Serial Bus specification.

According to an embodiment of the present invention, for example, an interface function unit corresponding to a setting of a dedicated terminal, which is set using a connectable device to which a card-type peripheral device is to be connected, is enabled, and a communication function unit performs communication with an electronic component through the enabled interface function unit.

According to an embodiment of the present invention, therefore, it is possible to switch between interfaces without causing a user to perform a time-consuming operation of switching therebetween using a switch.

DESCRIPTION OF THE PREFERRED EMBODIMENTS

An embodiment of the present invention will be described in connection with the drawings.

Figure 1:
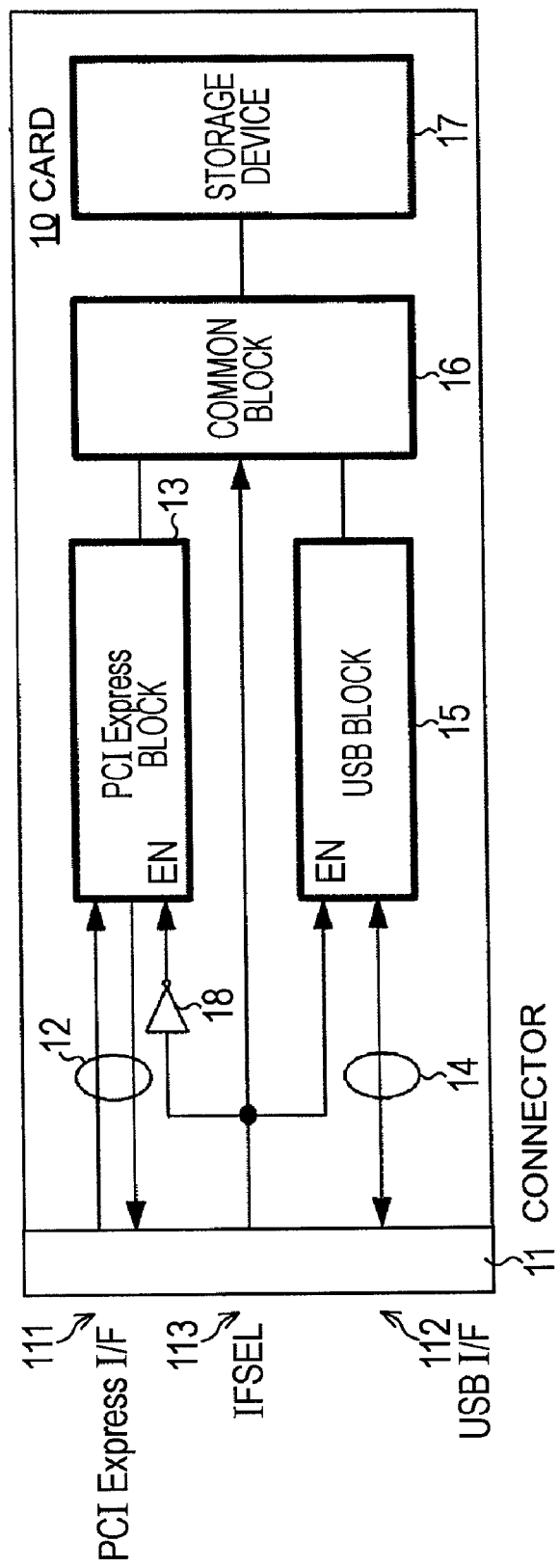
FIG. 1 is a functional block diagram showing an example structure of a card-type peripheral device according to an embodiment of the present invention.

FIG. 1 is a functional block diagram showing an example structure of a card-type peripheral device according to an embodiment of the present invention.

Figure 2:
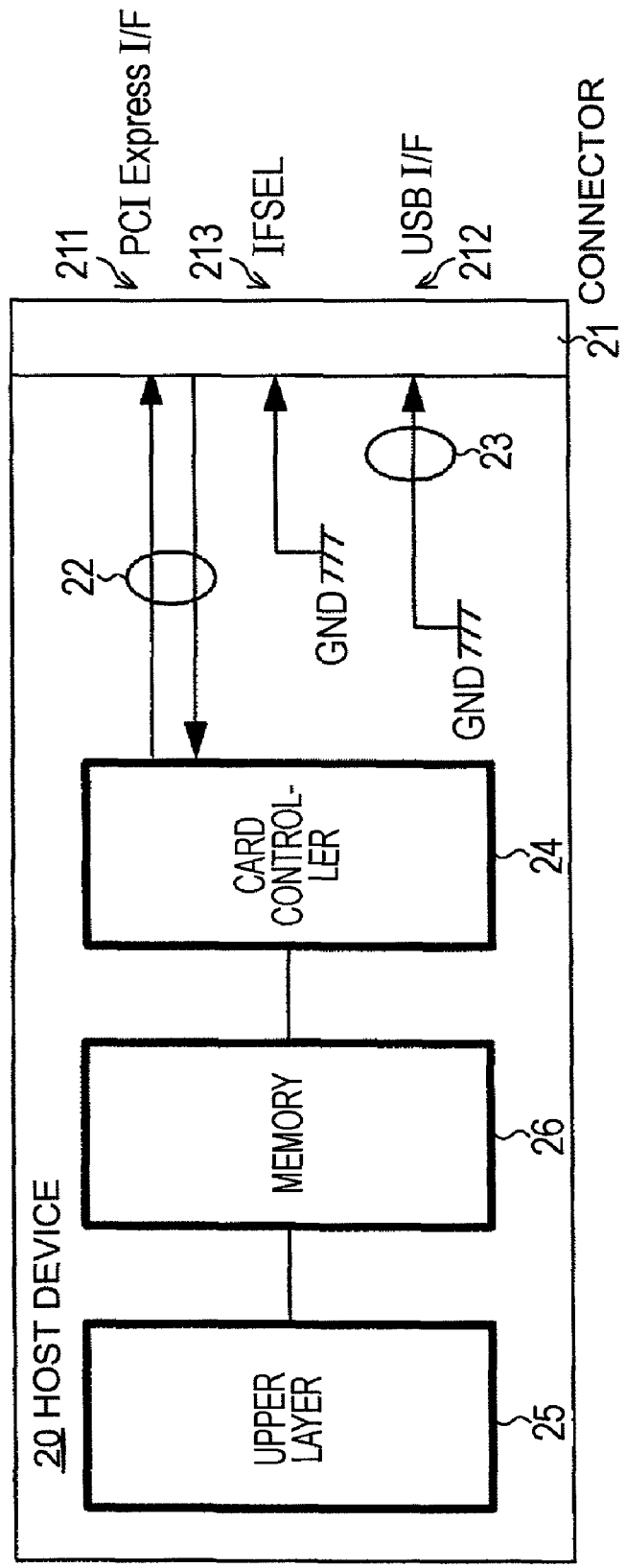
FIG. 2 is a functional block diagram showing an example structure of a host device to which the card-type peripheral device shown in FIG. 1 is connectable.

FIG. 2 is a functional block diagram showing an example structure of a host device to which the card-type peripheral device shown in FIG. 1 is connectable.

First, an overview of a characteristic structure and functions of the card-type peripheral device according to the present embodiment will be described. Then, example structures of devices to which the card-type peripheral device shown in FIG. 1 is connectable will be described in the context of a host device, a USB adapter, and an ExpressCard adapter.

The card-type peripheral device according to the present embodiment may be a PC card medium that directly uses a PCI Express or USB interface as an interface. The card-type peripheral device may include an internal non-volatile memory, and may have a function of a memory card configured to record and reproduce data via the interface.

The card-type peripheral device is also used as a compact high-density memory module with respect to a high-performance mobile-device removable medium of a host device such as a video camera or a digital still camera, and is thus configured as a memory card with compatibility in the functionality, the number of pins, etc.

As shown in FIG. 1, a memory card 10, which may be the card-type peripheral device of the present embodiment, includes a connector 11, a transmission line 12 for a PCI Express interface, a PCI Express block 13 serving as a first interface function unit, a transmission line 14 for a USB interface, a USB block 15 serving as a second interface function unit, a common block 16 serving as a communication function unit, a storage device 17, and an inverter 18.

The functional blocks of the memory card 10 will be described in connection with FIG. 1.

First, the connector 11 of the memory card 10 will be described.

The connector 11 is a connector dedicated to the memory card 10. The connector 11 includes a terminal 111 for the PCI Express interface and a terminal 112 for the USB interface.

The connector 11 further includes an IFSEL input terminal (interface selection terminal) 113 serving as a dedicated terminal for switching between both interfaces.

In addition to the terminals described above, the connector 11 further includes a power supply terminal, a ground (GND) terminal, and a terminal used by a host device to detect a card, which are not described herein.

Next, an internal block structure and functions of the memory card 10, and a connection between the blocks of the memory card 10 will be described.

The PCI Express block 13 is a functional block that controls the PCI Express interface.

The PCI Express block 13 is connected to the terminal 111 of the connector 11 via the transmission line 12.

The USB block 15 is a functional block that controls the USB interface.

The USB block 15 is connected to the terminal 112 of the connector 11 via the transmission line 14.

The common block 16 is a functional block that controls data transfer to or from the PCI Express block 13 or the USB block 15 and that controls the reading or writing of data from or to the storage device 17.

The common block 16 includes a central processing unit (CPU), a software storage memory, a working memory, a data buffer, and dedicated hardware components.

The storage device 17 is a memory region for holding data in a rewritable manner, and serves as a memory (recording area) of a memory card. The storage device 17 is formed of a non-volatile memory such as a NAND flash memory.

Next, the function of switching between the PCI Express interface and the USB interface will be described.

The IFSEL input terminal 113 of the connector 11 is connected to an input pin EN (enable) of the PCI Express block 13 through the inverter 18.

A signal input to the IFSEL input terminal 113 of the connector 11, which has a level logically inverted using the inverter 18, is supplied to the input terminal (pin) EN (enable) of the PCI Express block 13.

The PCI Express block 13 is enabled, for example, when a signal of logic "1" is input to the input pin EN.

The IFSEL input terminal 113 of the connector 11 is directly connected to an input pin EN (enable) of the USB block 15. The IFSEL input terminal 113 is also directly connected to the common block 16.

The signal input to the IFSEL input terminal 113 of the connector 11 is supplied to the input pin EN (enable) of the USB block 15 without inverting the level of the signal. The USB block 15 is enabled, for example, when a signal of logic "1" is input to the input pin EN.

Accordingly, the PCI Express block 13 and the USB block 15 are controlled so that one of the PCI Express block 13 and the USB block 15 is enabled according to the level of the signal input to the IFSEL input terminal 113 of the connector 11.

The IFSEL terminal 113 is clamped to a power supply potential (whose level corresponds to logic "1") or ground potential GND (whose level corresponds to logic "0") on a host device to which the memory card 10 is connected or on any of various adapters.

When the IFSEL terminal 113 is clamped to the ground potential GND, the input pin EN of the PCI Express block 13 is set to logic "1". Thus, the control of the PCI Express interface is enabled.

On the other hand, the input pin EN of the USB block 15 is set to logic "0". Thus, the control of the USB interface is disabled.

Since the IFSEL terminal 113 has logic value 0, the common block 16 recognizes that the control of the PCI Express interface is enabled, and controls the PCI Express block 13 to transfer data to or from the storage device 17.

When the IFSEL terminal 113 is clamped to the power supply potential, the input pin EN of the PCI Express block 13 is set to logic "0". Thus, the control of the PCI Express interface is disabled.

On the other hand, the input pin EN of the USB block 15 is set to logic "1". Thus, the control of the USB interface is enabled.

Since the IFSEL terminal 113 has logic value 1, the common block 16 recognizes that the control of the USB interface is enabled, and controls the USB block 15 to transfer data to or from the storage device 17.

The inverter 18 may be connected to the input pin EN (enable) of the USB block 15 instead of the input pin EN (enable) of the PCI Express block 13.

In this case, the relationship between the logic level of the IFSEL terminal 113 and the enablement of the interfaces is opposite to that described above.

Next, functional blocks of a host device 20 to which the memory card 10 is to be connected will be described in connection with FIG. 2. The internal structure of the memory card 10 to be connected to the host device 20 is similar to that shown in FIG. 1.

In the present embodiment, the host device 20 is, for example, a camera device configured to capture an image of an object to generate image data. The memory card 10 serves as a medium storing the image data.

As shown in FIG. 2, the host device 20 includes a connector 21, a transmission line 22 for a PCI Express interface, a transmission line 23 for a USB interface, a card controller 24, an upper layer 25, and a memory 26.

The functional blocks of the host device 20 will be described in connection with FIG. 2.

First, the connector 21 of the host device 20 will be described.

The connector 21 is a connector physically connectable to the connector 11 of the memory card 10 shown in FIG. 1. The connector 21 has an arrangement of terminals corresponding to the arrangement of terminals of the connector 11 in one-to-one correspondence. The connectors 11 and 21 are connected to establish communication between the memory card 10 and the host device 20.

That is, the connector 21 includes a terminal 211 for the PCI Express interface and a terminal 212 for the USB interface. In the host device 20, preferably, the terminal 212 is connected to the ground potential GND because the USB interface is not in use.

The connector 21 further includes a terminal 213 for transmitting a dedicated signal IFSEL for switching between both interfaces. The terminal 213 is connected to the ground potential GND.

Next, an internal block structure of the host device 20 and a connection between the blocks of the host device 20 will be described.

The card controller 24 is a control block dedicated to the memory card 10 having the PCI Express interface, and is connected to the connector 21 via the transmission line 22.

The card controller 24 is configured to control the PCI Express interface, and is further configured to detect a card and to supply power to the card.

The upper layer 25 includes hardware resources for generating image data, and software (application) for controlling the hardware resources.

The memory 26 is a memory storing various types of data, and includes a memory storing the software, a working memory, and a memory storing actual data.

Next, internal processing of the host device 20 in accordance with the state of the terminals of the connector 21 will be described.

As described above, the IFSEL terminal 213 is clamped to the ground potential GND or the power supply potential at the host device side to switch between interfaces.

In the present embodiment, the PCI Express interface is used, and the IFSEL terminal 213 is clamped to the ground potential GND. In the host device 20, as described above, since the USB interface is not in use, the terminal 212 is preferably clamped to the ground potential GND.

In a case where the host device 20 is a host device using the USB interface, the card controller 24 may be provided with a USB interface function, and may be connected to the connector 21 via the transmission line 22. In this case, preferably, the IFSEL terminal 213 is clamped to the power supply potential, and a host-device output signal of the PCI Express interface is set to the ground potential GND while an input signal thereof is set open (this processing is hereinafter referred to as "non-use processing").

The structure and functions of the memory card 10, which may be the card-type peripheral device according to the present embodiment, and the structure and functions of a host device to which the memory card 10 is connectable have been described.

Various adapters for the memory card 10 will now be described in order. The internal structure of the memory card 10 to be connected to each adapter is similar to that shown in FIG. 1.

Figure 3:
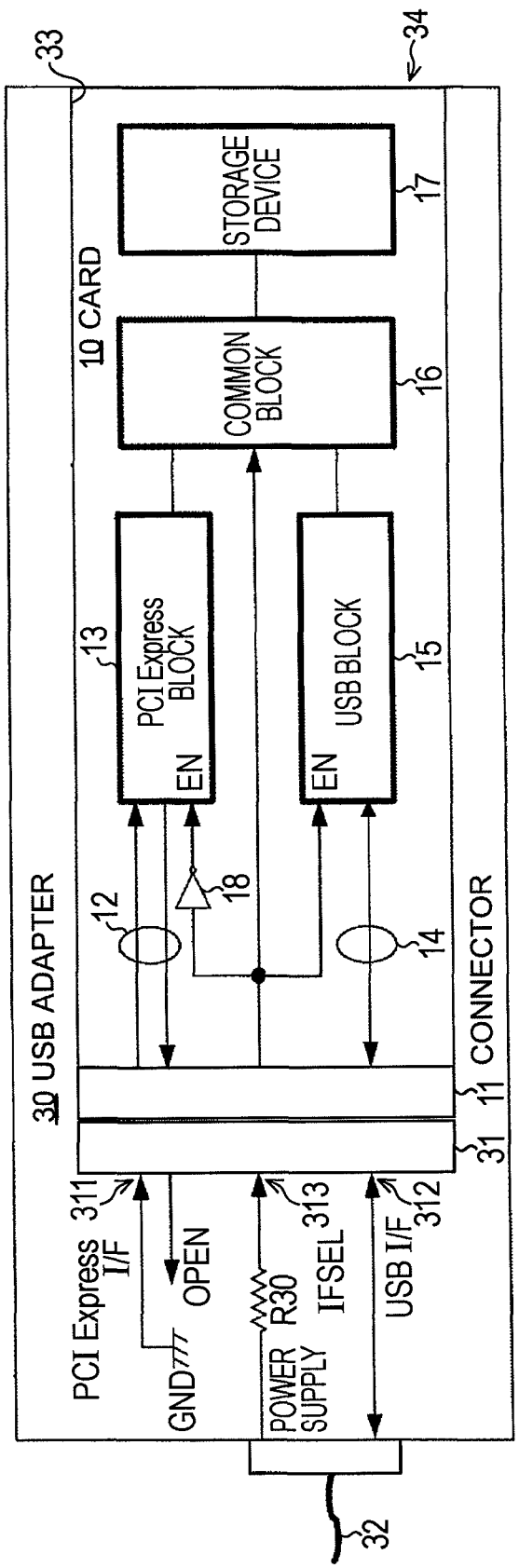
FIG. 3 is a diagram showing a USB cable adapter in which a memory card is inserted.
Figure 4:
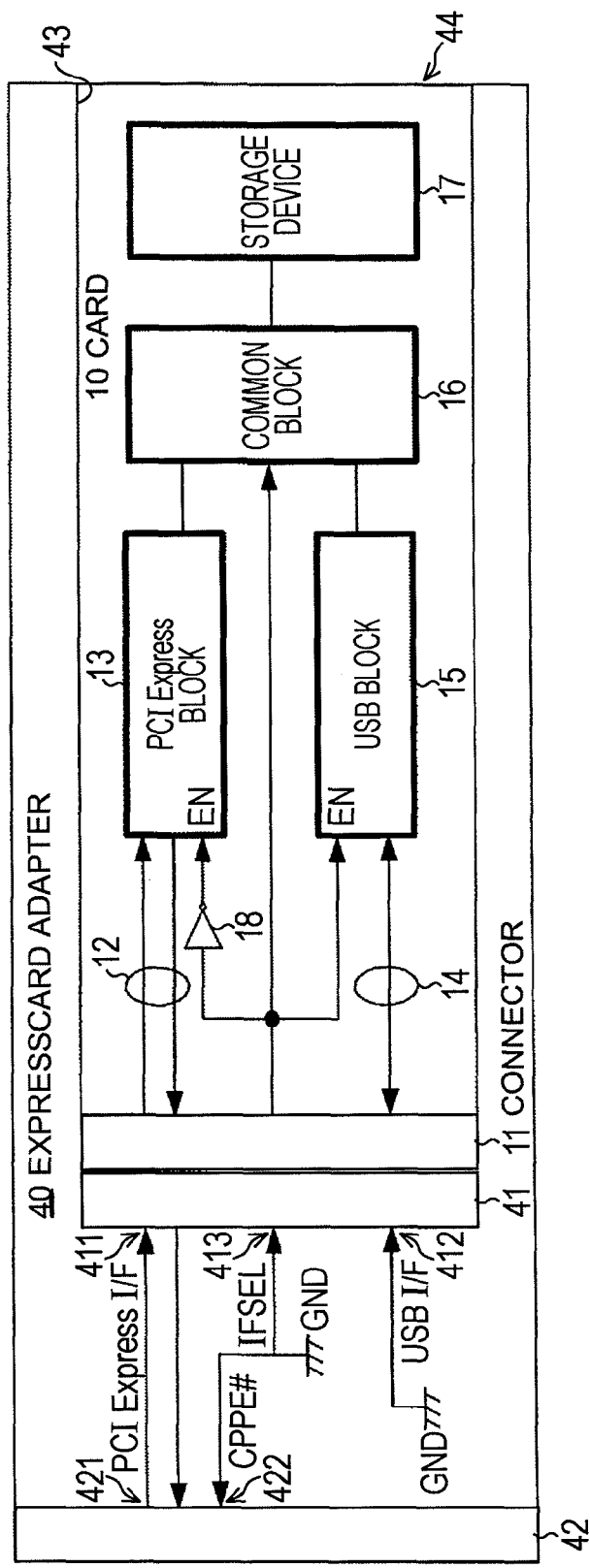
FIG. 4 is a diagram showing a PCI-Express-based Express-Card adapter in which a memory card is inserted.

FIG. 3 is a diagram showing a USB cable adapter in which the memory card 10 is inserted. FIG. 4 is a diagram showing a PCI-Express-based ExpressCard adapter in which the memory card 10 is inserted.

Referring to FIG. 3, a USB adapter 30 includes a connector 31, and has a USB cable 32 externally connected thereto. The memory card 10 is inserted into a card receiving portion 33 of the USB adapter 30 through a slot 34, and the connector 11 of the memory card 10 is connected to the connector 31.

The connector 31 includes a terminal 311 for a PCI Express interface and a terminal 312 for a USB interface.

The connector 31 further includes a terminal 313 for a dedicated signal IFSEL for switching between both interfaces.

Inside the USB adapter 30, the USB interface is directly linked between the connector 31 and the USB cable 32. Power is supplied through the USB cable 32.

A regulator or any other suitable component is connected between the USB cable 32 and the connector 31, as necessary, to adjust a voltage so as to conform to the specification of the memory card 10.

The IFSEL terminal 313 is clamped to the power supply through a resistor R30. The clamped power supply has a voltage equal to a voltage output from the regulator. The non-use processing described above is applied to the PCI Express interface.

In a case where, instead of the USB adapter 30, a cable adapter using a PCI Express interface is used, the PCI Express interface is directly linked between the connector 31 and a PCI Express cable. The power supply is provided through the PCI Express cable, and the power supply voltage is adjusted so as to conform to the specification of the memory card 10, as necessary.

An IFSEL terminal is clamped to the ground potential GND, and the non-use processing described above is applied to the USB interface.

Referring to FIG. 4, an ExpressCard adapter 40 includes a connector 41, and has an ExpressCard connector 42 formed at an end thereof. The memory card 10 is inserted into a card receiving portion 43 of the ExpressCard adapter 40 through a slot 44, and the connector 11 of the memory card 10 is connected to the connector 41.

The connector 41 includes a terminal 411 for a PCI Express interface and a terminal 412 for a USB interface.

The connector 41 further includes a terminal 413 for a dedicated signal IFSEL for switching between both interfaces.

The ExpressCard connector 42 includes a terminal 421 for the PCI Express interface and a CPPE# terminal 422.

Inside the ExpressCard adapter 40, the PCI Express interface is directly linked between the connector 41 and the ExpressCard connector 42, and the CPPE# terminal 422 of the ExpressCard connector 42 is clamped to the ground potential GND.

Power is supplied through the ExpressCard connector 42. The IFSEL terminal 413 is clamped to the ground potential GND. The non-use processing described above is applied to the USB interface.

In a case where, instead of the ExpressCard adapter 40, a USB-based ExpressCard-adapter is used, the USB interface is directly linked between the connector 41 and the Express-Card connector 42, and a CPUSB# terminal provided on the ExpressCard connector 42 is clamped to the ground potential GND.

Power is supplied through the ExpressCard connector 42. An IFSEL terminal is clamped to the power supply, and the non-use processing described above is applied to the PCI Express interface.

In the present embodiment, the CPPE# or CPUSB# terminal is clamped to the ground potential GND on the Express-Card adapter 40. Alternatively, the dedicated card detection terminal provided on the memory card 10 may be directly connected to the CPPE# or CPUSB# terminal.

In the ExpressCard adapter 40, it is not necessary to individually provide adapters for the PCI Express and USB interfaces. That is, an adapter can be shared, and a dedicated mechanical switch may be mounted on a housing of the adapter to switch between the interfaces.

Figure 5:
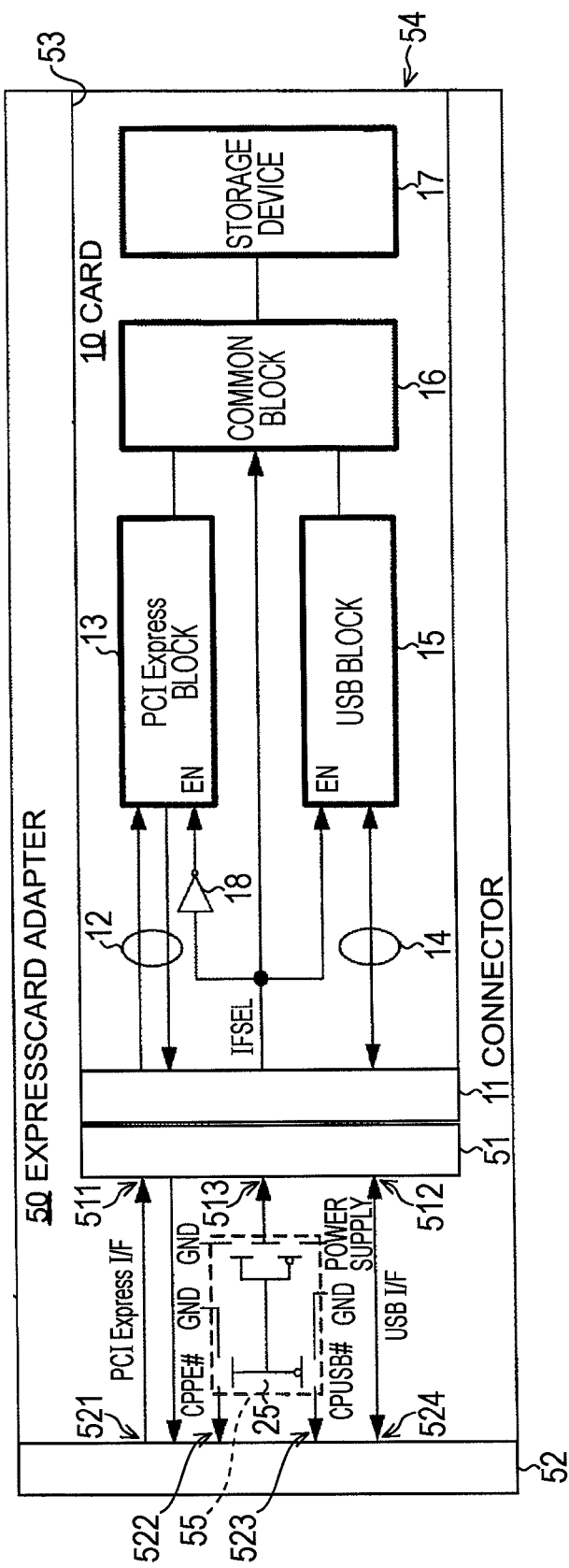
FIG. 5 is a diagram showing a PCI-Express-based Express-Card adapter having a switch, in which a memory card is inserted.

FIG. 5 is a diagram showing a PCI-Express-based Express-Card adapter having a switch, in which the memory card 10 is inserted.

An ExpressCard adapter 50 includes a connector 51, and has an ExpressCard connector 52 formed at an end thereof. The memory card 10 is inserted into a card receiving portion 53 of the ExpressCard adapter 50 through a slot 54, and the connector 11 of the memory card 10 is connected to the connector 51.

The connector 51 includes a terminal 511 for a PCI Express interface and a terminal 512 for a USB interface.

The connector 51 further includes a terminal 513 for a dedicated signal IFSEL for switching between both interfaces.

The ExpressCard connector 52 includes a terminal 521 for the PCI Express interface, a CPPE# terminal 522, a CPUSB# terminal 523, and a terminal 524 for the USB interface.

Inside the ExpressCard adapter 50, the PCI Express and the USB interface are directly linked between the connector 51 and the ExpressCard connector 52. The ExpressCard adapter 50 is provided with a mechanical switch 55 to switch the potential to which each of the CPPE# terminal 522, the CPUSB# terminal 523, and the IFSEL terminal 513 is clamped.

In a case where the mechanical switch 55 is set to use the PCI Express interface, the CPPE# terminal 522 is clamped to the ground potential GND, the CPUSB# terminal 523 is clamped open, and the IFSEL terminal 513 is clamped to the ground potential GND.

In a case where the mechanical switch 55 is set to use the USB interface, on the other hand, the CPPE# terminal 522 is clamped open, the CPUSB# terminal 523 is clamped to the ground potential GND, and the IFSEL terminal 513 is clamped to the power supply potential. As described above, the card detection terminal of the memory card 10 may be connected to the CPPE# terminal 522 and the CPPUSB# terminal 523.

A light-emitting diode (LED) (not shown) serving as a notification unit may be provided at the rear of the Express-Card adapter 50. As is beneficial for a user, the LED changes the color of emitted light to visually notify the user of an interface currently being used.

Light may not necessarily be continuously emitted from the LED for a period of time during which power is supplied to the adapter 50. It is more useful to combine the light emission condition of the LED with the condition of the memory card 10.

Desirably, memory cards are provided with an LED. However, the provision is difficult due to the increased compactness of the cards and the increased capacity of storage regions of the cards.

It is therefore preferable that an adapter be provided with an LED that emits light under any condition suitable for a memory card.

As a method of implementing such an adapter, for example, the connector 11 is provided with a dedicated LEDON terminal (output terminal). The LEDON terminal is controlled by the common block 16 that manages data transfer to the storage device 17 so that the LEDON terminal is set to logic "1" for a period of time during which data is written to or read from the storage device 17 and is set to logic "0" otherwise.

The ExpressCard adapter 50 is configured to turn on the LED when the LEDON terminal of the memory card 10 is set to logic value 1, and to turn off the LED when the LEDON terminal is set to logic value 0.

The ExpressCard adapter 50 is also configured to change the color of the LED according to, for example, the interface to be used. For example, a plurality of LEDs that emit light of different colors may be provided.

While this LEDON terminal has been described in combination with a mechanism for notifying a user of an interface, the LEDON terminal is not originally designed to relate to the notification of an interface to be used. Thus, the LEDON terminal can be used for the host device 20, the USB adapter 30, or the ExpressCard adapter 40.

With this configuration, a user can grasp access to the storage device 17 within the memory card 10, which is hidden from the user. This prevents an accident caused by removing a card from a host device during its access.

As in the present embodiment, the provision of both PCI Express and USB interfaces would cause an increase in power consumption. Even if one of the interfaces is not in use, an analog circuit and logic circuit that control this interface are physically present and a problem to be solved is to reduce the power consumption thereof.

An overview of functions has been briefly described in the context of the input pins EN (enable) of the PCI Express block 13 and the USB block 15 with reference to FIGS. 1, 3, 4, and 5. A more detailed embodiment will now be described.

Figure 6:
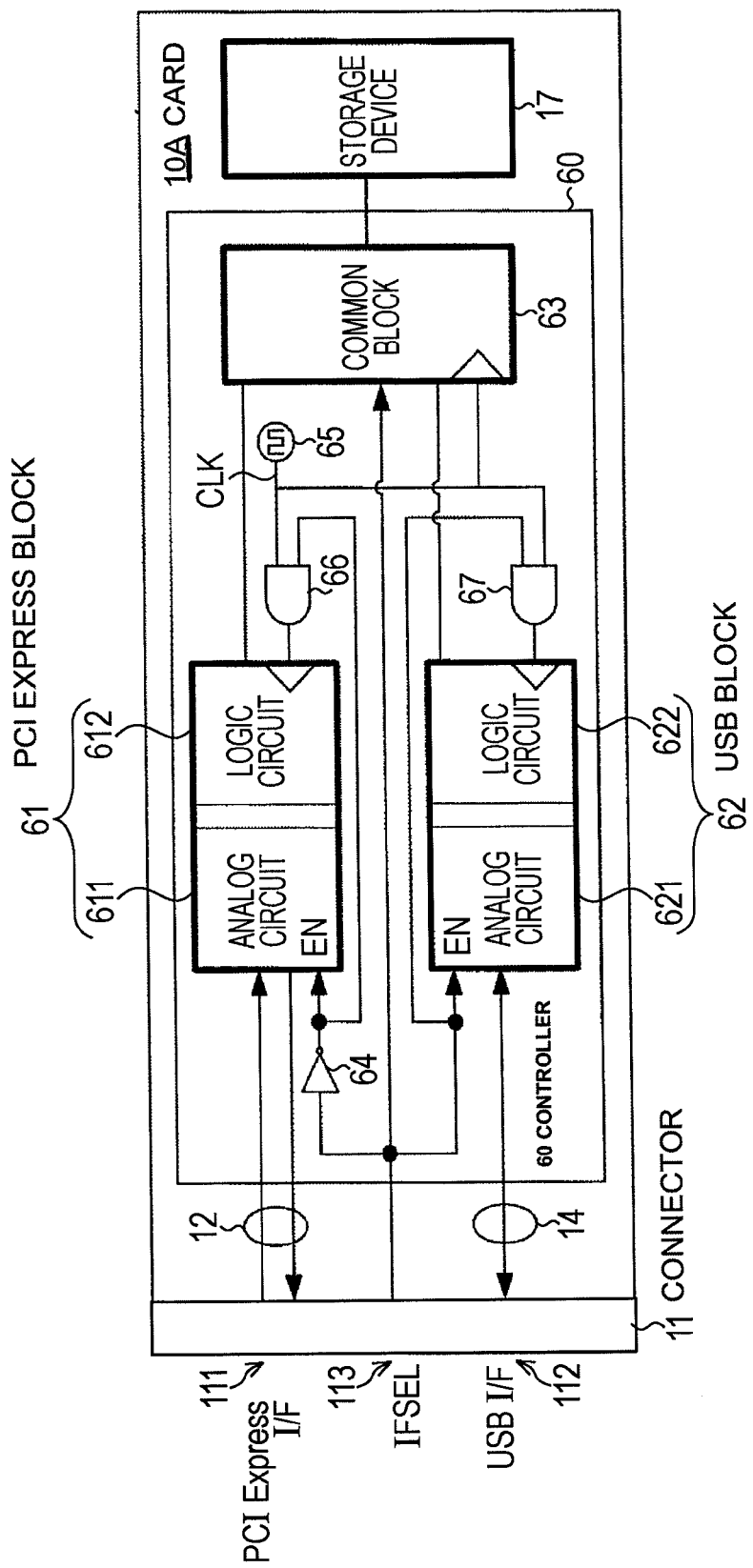
FIG. 6 is a diagram showing an example internal hardware configuration of a memory card according to the embodiment.

FIG. 6 is a diagram showing an example internal hardware configuration of a memory card 10A according to this embodiment.

In the memory card 10A shown in FIG. 6, for ease of understanding, components similar to those of the memory card 10 shown in FIGS. 1, 3, 4, and 5 are represented by the same reference numerals.

The memory card 10A includes a connector 11, transmission lines 12 and 14, a storage device 17, and a controller 60 including a PCI Express block, a USB block, and a common block.

The controller 60 controls communication between the interfaces and the storage device 17.

The controller 60 includes a PCI Express block 61, a USB block 62, a common block 63, an inverter 64, a clock generator 65, and two-input ANDs 66 and 67.

The PCI Express block 61 of the controller 60 includes an analog circuit 611 and a logic circuit 612. The PCI Express interface is connected to a terminal 111 of the connector 11 via the transmission line 12.

The USB block 62 includes an analog circuit 621 and a logic circuit 622. The USB interface is connected to a terminal 112 of the connector 11 via the transmission line 14.

The common block 63 is a functional block that controls data transfer to or from the PCI Express block 61 or the USB block 62 and that controls the reading or writing of data from or to the storage device 17. The common block 63 includes a CPU, a software storage memory, a working memory, a data buffer, and dedicated hardware components.

The inverter 64 has an input connected to an IFSEL input terminal 113 of the connector 11, and an output connected to an input pin EN (enable) of the analog circuit 611 of the PCI Express block 61 and a first input terminal of the two-input AND 66.

A signal input to the IFSEL input terminal 113 of the connector 11, which has a level logically inverted using the inverter 64, is supplied to the input terminal (pin) EN (enable) of the analog circuit 611 of the PCI Express block 61 and the two-input AND 66.

The PCI Express block 61 is enabled, for example, when a signal of logic "1" is input to the input pin EN.

The IFSEL input terminal 113 of the connector 11 is directly connected to an input pin EN (enable) of the analog circuit 621 of the USB block 62 and a first input terminal of the two-input AND 67. The IFSEL input terminal 113 is also directly connected to the common block 63.

The signal input to the IFSEL input terminal 113 of the connector 11 is supplied to the input pin EN (enable) of the analog circuit 621 of the USB block 62 and the two-input AND 67 without inverting the level of the signal. The USB block 62 is enabled, for example, when a signal of "logic" 1 is input to the input pin EN.

Accordingly, the PCI Express block 61 and the USB block 62 are controlled so that one of the PCI Express block 61 and the USB block 62 is enabled according to the level of the signal input to the IFSEL input terminal 113 of the connector 11.

The clock generator 65, which may be an on-chip clock generator, has a clock output connected to second input terminals of the two-input ANDs 66 and 67. A clock signal CLK output from the clock generator 65 allows clock synchronization circuits of the logic circuits 612 and 622 and the common block 63 to operate.

In the example shown in FIG. 6, the clock generator 65 is an on-chip clock generator by way of example. The clock generator 65 may be externally mounted on the controller 60.

When the signal input to the IFSEL input terminal 113 of the connector 11 has logic "0" level and is logically inverted using the inverter 64 and the signal of logic "1" is supplied to the input terminal (pin) EN (enable) of the analog circuit 611 of the PCI Express block 61 and the two-input AND 66, the clock signal CLK is supplied to the clock synchronization circuit of the logic circuit 612 of the PCI Express block 61.

Since the signal of logic "0" is supplied to the two-input AND 67, the supply of the clock signal CLK to the clock synchronization circuit of the logic circuit 622 of the USB block 62 is stopped.

When the signal input to the IFSEL input terminal 113 of the connector 11 has logic "1" level and is logically inverted using the inverter 64 and the signal of logic "0" is supplied to the input terminal (pin) EN (enable) of the analog circuit 611 of the PCI Express block 61 and the two-input AND 66, the supply of the clock signal CLK to the clock synchronization circuit of the logic circuit 612 of the PCI Express block 61 is stopped.

Since the signal of logic "1" is supplied to the two-input AND 67, the clock signal CLK is supplied to the clock synchronization circuit of the logic circuit 622 of the USB block 62.

Next, the analog circuits 611 and 621 and the logic circuits 612 and 622 will be described.

As described above, each of the analog circuits 611 and 621 has an input pin EN. In a case where the pin EN is set to logic "1" (enable), the circuit that performs interface control is enabled. In a case where the pin EN is set to logic "0" (disable), the circuit that performs interface control is disabled.

An analog circuit to be targeted is disabled, which means that the circuit does not consume power other than leakage.

The logic circuits 612 and 622 operate in clock synchronization.

Thus, the logic circuits 612 and 622 are enabled when the clock signal CLK is supplied from outside the circuits 612 and 622, and are disabled when the clock signal CLK is not supplied.

A logic circuit to be targeted is disabled, which means that the circuit does not consume power other than leakage.

The internal control of the controller 60 based on the signal IFSEL will now be described.

When the IFSEL terminal 113 is clamped to the ground potential GND on a host device to which the memory card 10A is connected or any adapter, due to the presence of the inverter 64, the pin EN of the analog circuit 611 is set to logic "1".

Since the first input terminal of the two-input AND 66 is also set to logic "1", the output clock signal CLK of the clock generator 65 is supplied to the logic circuit 612. Inversely, the pin EN of the analog circuit 621 is set to logic "0".

Since the first input terminal of the two-input AND 67 is also set to logic "0", the output clock signal CLK of the clock generator 65 is not supplied to the logic circuit 622.

Therefore, only the operation of the PCI Express block 61 is enabled while the operation of the USB block 62 is disabled. That is, the USB block 62 does not consume power other than leakage.

When the IFSEL terminal 113 is clamped to the power supply on a host device to which the memory card 10A is connected or any adapter, due to the presence of the inverter 64, the pin EN of the analog circuit 611 is set to logic "0".

Since the first input terminal of the two-input AND 66 is set to logic "0", the output clock signal CLK of the clock generator 65 is not supplied to the logic circuit 612.

On the other hand, the pin EN of the analog circuit 621 is set to logic "1". The first input terminal of the two-input AND 67 is also set to logic "1". Thus, the output clock signal CLK of the clock generator 65 is supplied to the logic circuit 622.

Therefore, only the operation of the USB block 62 is enabled while the operation of the PCI Express block 61 is disabled.

That is, the PCI Express block 61 does not consume power other than leakage.

According to the present embodiment, therefore, a memory card capable of minimizing the increase in power consumption and achieving the advantages of both PCI Express and USB interfaces can be achieved. The development of various low-cost adapters is also facilitated.

In the present embodiment, two types of interface specifications, namely, PCI Express and USB interface specifications, have been described. However, other interface specifications such as Serial ATA (Serial Advanced Technology Attachment) may be used.

It should be understood by those skilled in the art that various modifications, combinations, sub-combinations and alterations may occur depending on design requirements and other factors insofar as they are within the scope of the appended claims or the equivalents thereof.

What is claimed is:

1. A card-type peripheral device having a plurality of external interfaces, the card-type peripheral device comprising:
    a connector configured to connect the card-type peripheral device to a connectable device connectable to the card-type peripheral device, the connector including a dedicated terminal in which an interface to be used is set;
    an electronic component configured to be accessed via the interface set by the dedicated terminal;
    a plurality of interface function units each configured to control an interface compliant with one of a plurality of specifications;
    a communication function unit configured to perform communication with the electronic component using one of the plurality of interface function units, the one interface function unit having a specification corresponding to a setting of the dedicated terminal;
    an analog circuit connected to the connector via a transmission line, the analog circuit including an enable terminal for determining whether the analog circuit is enabled or disabled according to the setting of the dedicated terminal; and
    a logic circuit configured to operate in synchronization with a clock signal to transmit and receive data to and from the communication function unit;
    wherein the interface function unit having the specification corresponding to the setting of the dedicated terminal is enabled, and at least one of the interface function units having a specification that does not correspond to the setting of the dedicated terminal is disabled
    wherein, in accordance with the setting of the dedicated terminal, at least one of the interface function units is configured such that the analog circuit is disabled and the supply of the clock signal to the logic circuit is stopped.

2. The card-type peripheral device according to claim 1, wherein a level of the dedicated terminal is set using the connectable device according to a specification.

3. The card-type peripheral device according to claim 1, wherein the communication function unit recognizes which specification of the plurality of specifications is enabled to be controlled on the basis of the setting of the dedicated terminal, and performs communication with the electronic component using one of the interface function units corresponding to the recognized specification.

4. The card-type peripheral device according to claim 1, wherein the connectable device is an adapter, and includes a switch capable of switching a setting of the dedicated terminal according to a specification supported by the connectable device to which the adapter is connected.

5. The card-type peripheral device according to claim 1, wherein the connector includes an output terminal capable of requesting the connectable device to transmit a condition to be notified.

6. The card-type peripheral device according to claim 5, wherein the connectable device includes a notification unit configured to transmit the condition in response to the request from the output terminal.

7. The card-type peripheral device according to claim 1, wherein the electronic component includes a non-volatile memory, and has a function of a memory card capable of recording and reproducing data via the set interface.

8. The card-type peripheral device according to claim 1, wherein the plurality of specifications include a Peripheral Component Interconnect Express specification and a Universal Serial Bus specification.

* * * * *